(12) United States Patent
Cayer

(10) Patent No.: US 7,843,653 B2
(45) Date of Patent: Nov. 30, 2010

(54) ACHROMATIC FLAT TOP BEAM SHAPING

(75) Inventor: Francis Cayer, Saint-Eustache (CA)

(73) Assignee: Coherent, Inc., Santa Clara, CA (US)

( * ) Notice: Subject to any disclaimer, the term of this patent is extended or adjusted under 35 U.S.C. 154(b) by 128 days.

(21) Appl. No.: 12/370,716

(22) Filed: Feb. 13, 2009

(65) Prior Publication Data

US 2010/0208356 A1  Aug. 19, 2010

(51) Int. Cl.
*G02B 9/00* (2006.01)
*G02B 13/18* (2006.01)
*F21V 5/04* (2006.01)

(52) U.S. Cl. .................. 359/754; 359/708; 362/268; 362/335

(58) Field of Classification Search ......... 359/754–756, 359/713–716; 362/259, 268, 335, 336
See application file for complete search history.

(56) References Cited

U.S. PATENT DOCUMENTS

| 4,826,299 | A | | 5/1989 | Powell |
| 5,946,141 | A | * | 8/1999 | Harrigan ................. 359/642 |
| 5,969,862 | A | * | 10/1999 | Maruyama .............. 359/565 |
| 7,626,769 | B2 | * | 12/2009 | Olmstead et al. ........... 359/721 |
| 2004/0264007 | A1 | * | 12/2004 | Hoffnagle et al. ........... 359/754 |

OTHER PUBLICATIONS

D. Marcuse, "Loss analysis of single-mode fiber splices", Bell Syst. Technical Journal, vol. 56, No. 5, 1977.

\* cited by examiner

*Primary Examiner*—Jordan M. Schwartz
(74) *Attorney, Agent, or Firm*—Morrison & Foerster LLP

(57) ABSTRACT

There is provided an optical system and method for shaping a polychromatic light into a substantially uniform profile beam along a first axis. A polychromatic divergent light with having multiple wavelength components is provided with a dispersion of divergence. A collimation optic collimates the polychromatic divergent light. A shaping lens shapes the collimated beam into a shaped beam with a nearly uniform profile along the first axis, the dispersion of divergence causing a deviation from uniformity of the nearly uniform profile. A focusing optic focuses the shaped beam. A combination of the collimation and focusing optics shows a chromatic focal shift that compensates for said dispersion of divergence, so as to reduce the deviation from uniformity to obtain a profile with a substantially uniform intensity along the first axis, for all of said multiple wavelength components.

20 Claims, 15 Drawing Sheets

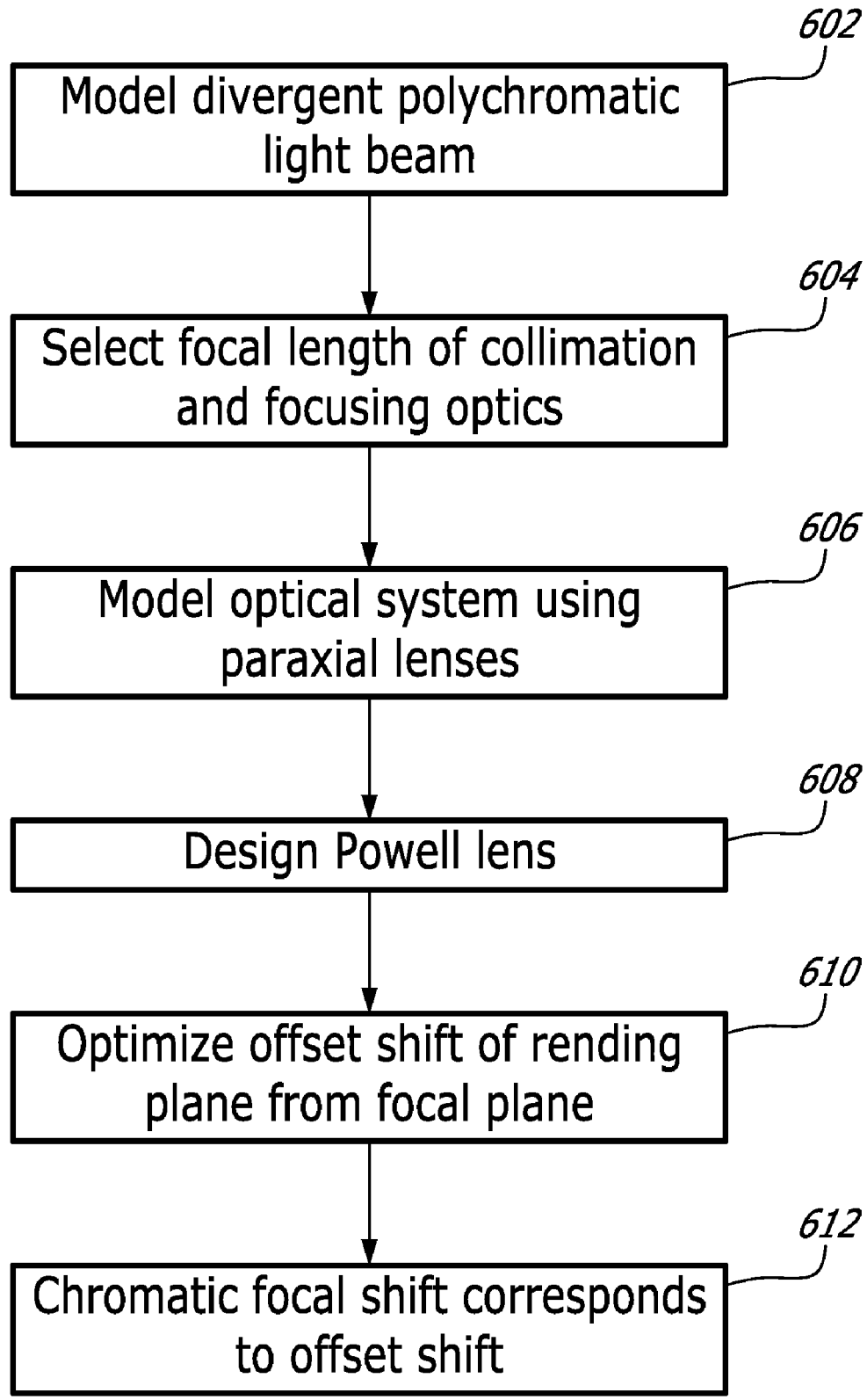

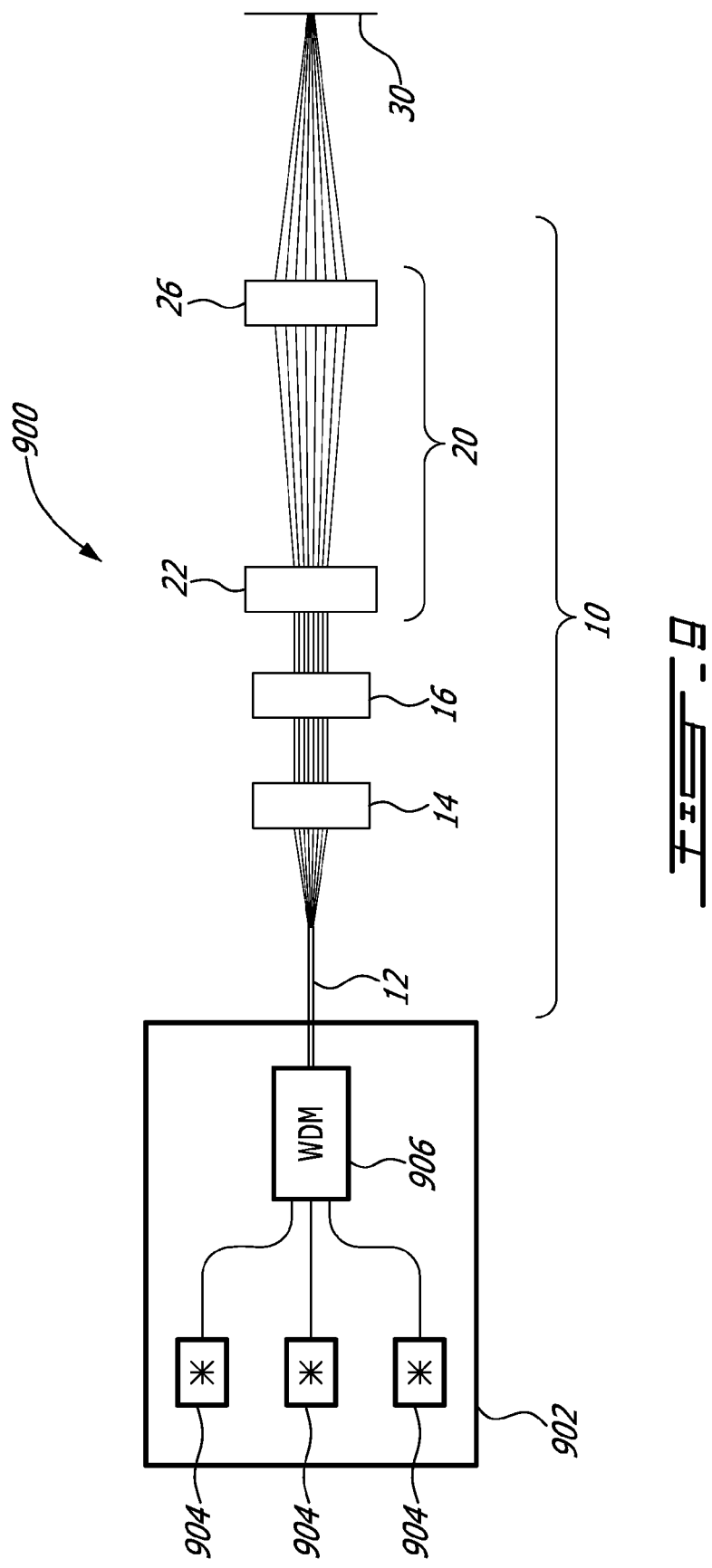

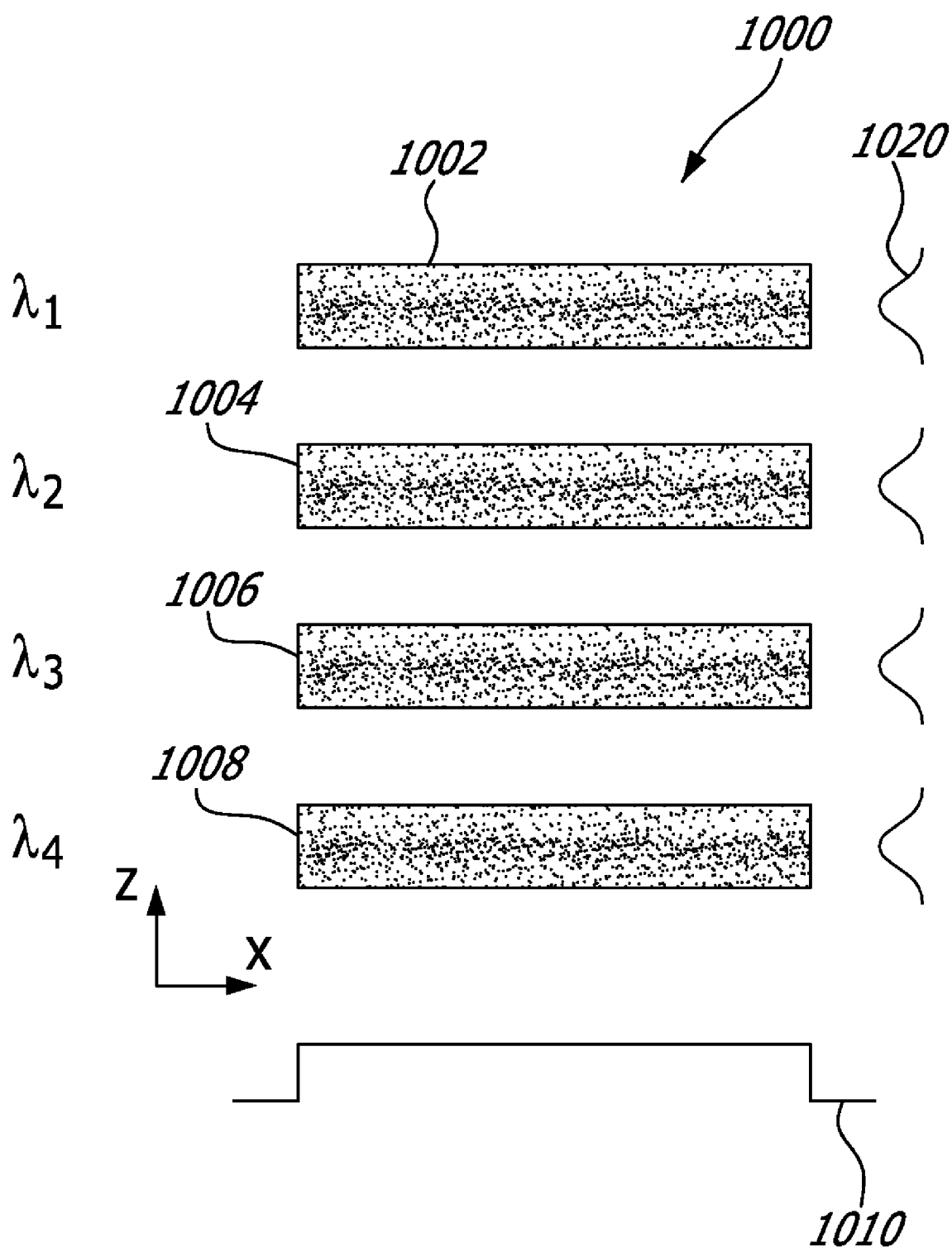

ACHROMATIC FLAT TOP BEAM SHAPING

TECHNICAL FIELD

The invention relates to laser beam shaping. More particularly, the invention relates to a beam shaping system and method adapted to provide a beam profile with controlled intensity distribution over a range of wavelength components.

BACKGROUND OF THE ART

While most laser sources and more precisely laser diode sources produce an astigmatic beam of light having a substantially non-uniform intensity profile, numerous laser applications require an illumination with a substantially uniform profile. Applications include biomedical applications, such as bio-detection, and precision inspection, such as inspection of microelectronic components, solar cells and others. Some more specific applications require a polychromatic illumination, i.e. with various wavelength components or over range of wavelengths, with a laser line of uniform intensity and width.

U.S. Pat. No. 4,826,299 to Powell, provides a lens for expanding a laser beam along one axis in order to provide a laser line of uniform intensity and width. Such a diverging lens has an acylindrical surface defined by a base curve in the shape of an angle with a rounded apex. The radius of curvature of the acylindrical surface is thus smaller in the center and increases smoothly towards both ends. As described in Powell, the acylindrical surface fits to a base curve defined in a Cartesian coordinate system (x,y,z) by the following equation:

$$y = \frac{cx^2}{1 + (1 - (1+Q)c^2x^2)^{1/2}}$$

wherein c is a curvature constant and Q is a conic constant, and wherein the product Q·c lies between 0.25 and 50 mm$^{-1}$ and Q is less than −1. The second surface of the acylindrical lens may either be planar or cylindrical.

A Powell lens is an achromatic refractive lens that provides great uniformity along a laser line but it is quite sensitive to the width of the laser beam at its input. For a Powell lens to be used to generate a polychromatic illumination with a uniform profile, the shape and width of the laser beam should be alike for all wavelengths of the laser beam. With refractive beam shaping techniques, a number of laser beams at various wavelengths with alike spatial profiles would need to be combined. This would require a quite complex optical system with many optical elements in precise alignment and using much space.

SUMMARY

There is provided an optical system and method for shaping a polychromatic light into a substantially uniform profile beam along a first axis. A polychromatic divergent light with having multiple wavelength components is provided with a dispersion of divergence. A collimation optic collimates the polychromatic divergent light. A shaping lens shapes the collimated beam into a shaped beam with a nearly uniform profile along the first axis, the dispersion of divergence causing a deviation from uniformity of the nearly uniform profile. A focusing optic focuses the shaped beam. A combination of the collimation and focusing optics shows a chromatic focal shift that compensates for the dispersion of divergence, so as to reduce the deviation from uniformity to obtain a profile with a substantially uniform intensity along the first axis, for all the multiple wavelength components.

One aspect of the invention provides an optical system for providing a polychromatic light beam with a substantially uniform profile along a first axis. The system comprises a collimation optic, a shaping lens and a focusing optic. The collimation optic receives a polychromatic divergent light having multiple wavelength components with a dispersion of divergence and collimates the polychromatic divergent light to provide a substantially collimated beam. The collimation optic has a first chromatic focal shift. The shaping lens has a primary surface with a curve adapted for shaping the collimated beam into a shaped beam with a nearly uniform profile along the first axis. The dispersion of divergence causes a deviation from uniformity of the nearly uniform profile for at least part of the multiple wavelength components. The focusing optic is positioned for focusing the shaped beam. The focusing optic has a second chromatic focal shift. A combination of the first chromatic focal shift and the second chromatic focal shift compensates for the dispersion of divergence, so as to reduce the deviation from uniformity to obtain a profile with a substantially uniform intensity along the first axis, for all the multiple wavelength components.

Another aspect of the invention provides a light beam source system for providing a polychromatic light beam with a substantially uniform profile along a first axis. The light beam source system comprises a polychromatic light source, an optical waveguide, a collimation optic, a shaping lens and a focusing optic. The polychromatic light source provides a polychromatic light having multiple wavelength components. The optical waveguide is coupled to the incident light source for propagating therein the polychromatic light. The polychromatic light exits the optical waveguide at an output. The optical waveguide has a cutoff wavelength defining a dispersion of divergence of the polychromatic light at the output. The collimation optic is positioned for collimating the polychromatic light at the output to provide a substantially collimated beam. The collimation optic has a first chromatic focal shift. The shaping lens has a primary surface with a curve adapted for shaping the collimated beam into a shaped beam with a nearly uniform profile along the first axis. The dispersion of divergence causes a deviation from uniformity of the nearly uniform profile for at least part of the multiple wavelength components. The focusing optic is positioned for focusing the shaped beam. The focusing optic has a second chromatic focal shift. A combination of the first chromatic focal shift and the second chromatic focal shift compensates for the dispersion of divergence, so as to reduce the deviation from uniformity to obtain a profile with a substantially uniform intensity along the first axis, for all the multiple wavelength components.

Yet another aspect of the invention provides a method for providing a polychromatic light beam with a substantially uniform profile along a first axis. A polychromatic divergent light having multiple wavelength components is provided with a dispersion of divergence. The polychromatic divergent light is collimated using a collimation optic to provide a substantially collimated beam along the first axis. The collimated beam is shaped into a shaped beam with a nearly uniform profile along the first axis, the dispersion of divergence causing a deviation from uniformity of the nearly uniform profile for at least part of the wavelength components of the polychromatic light. The shaped beam is focused along the first axis using a focusing optic. A chromatic focal shift of a combination of the collimation optic and the focusing optic is selected such that the chromatic focal shift compensates for the dispersion of divergence, so as to reduce the deviation from uniformity to obtain a profile with a substantially uniform intensity along the first axis for all the multiple wavelength components.

In this specification, the term "acylindrical surface" is intended to mean a surface generated by a straight line which moves so that it always intersects a given plane curve called the base curve, and remains normal to the plane of the base curve, the base curve not consisting of a segment of a circle. In contrast, a "cylindrical surface" is intended to mean a surface as defined above but the base curve consisting of a segment of a circle.

BRIEF DESCRIPTION OF THE DRAWINGS

FIG. 4A corresponds to a width of the light beam of 1.050 mm; FIG. 4B corresponds to a width of the light beam of 1.025 mm; FIG. 4C corresponds to a width of the light beam of 0.975 mm; FIG. 4D corresponds to a width of the light beam of 0.950 mm; and FIG. 4E corresponds to a width of the light beam of 1.000 mm;

FIG. 5A corresponds to a width of the light beam of 1.050 mm and a plane offset by 40 μm; FIG. 5B corresponds to a width of the light beam of 1.025 mm and a plane offset by 20 μm; FIG. 5C corresponds to a width of the light beam of 0.975 mm and a plane offset by −15 μm; and FIG. 5D corresponds to a width of the light beam of 0.950 mm and a plane offset by −30 μm;

FIG. 6 is a flowchart illustrating an example method for selecting the chromatic focal shift to be used in the optical system of FIG. 1;

FIG. 8A corresponds to a wavelength of 660 nm; FIG. 8B corresponds to a wavelength of 560 nm; FIG. 8C corresponds to a wavelength of 493 nm; FIG. 8D corresponds to a wavelength of 404 nm;

FIG. 9 is a block diagram illustrating a light beam source system for generating a polychromatic light beam having a substantially uniform profile along a first axis.

FIG. 10 is a diagram illustrating a possible two-dimensional pattern of a beam showing multiple uniform sub-patterns;

FIG. 12 is a block diagram illustrating a second optical system adapted to produce the pattern of FIG. 10 using a single optical fiber and a dispersive prism element.

It will be noted that throughout the appended drawings, like features are identified by like reference numerals.

DETAILED DESCRIPTION

Figure 1:
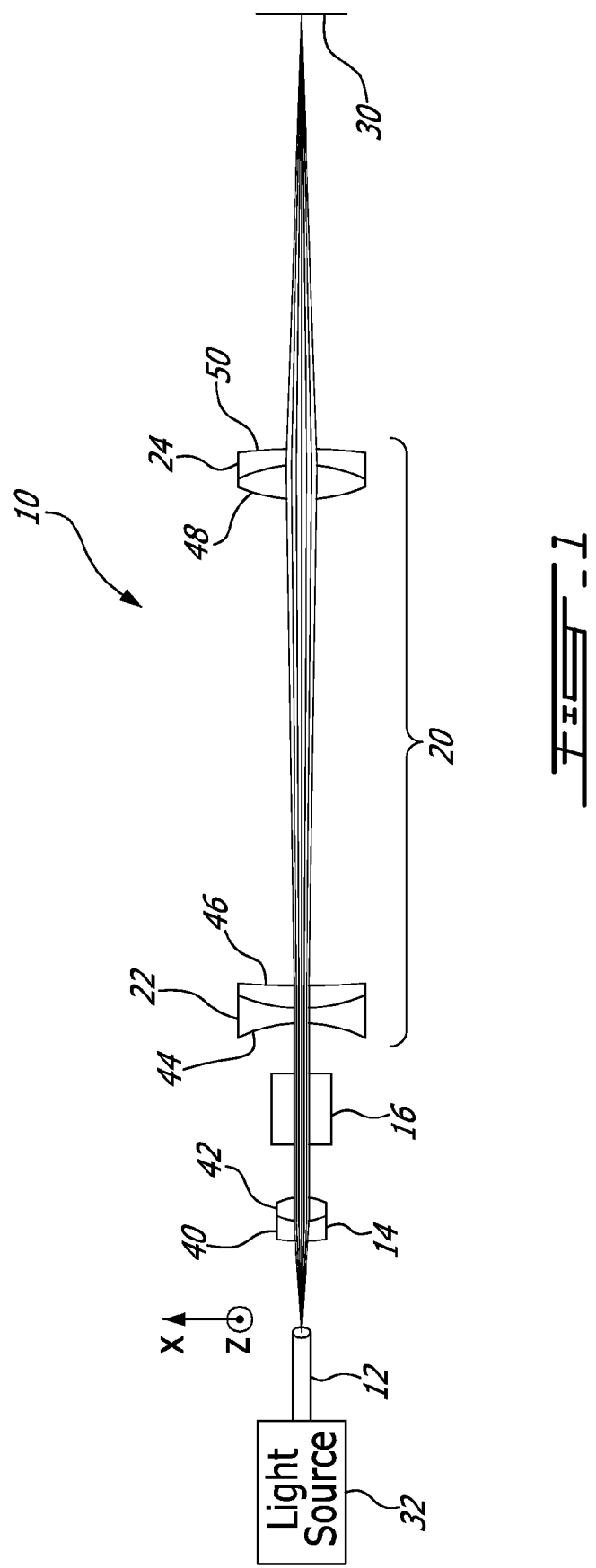
FIG. 1 is a block diagram illustrating an optical system for shaping a polychromatic light into a beam with a substantially uniform profile.

Now referring to the drawings, FIG. 1 illustrates an optical system 10 for shaping a polychromatic light into a substantially uniform profile beam along one axis, in this case, the x-axis. The optical system 10 comprises an optical fiber 12. It also comprises a collimation optic 14, a beam shaping Powell lens 16 and a focusing optic 20 positioned in this order along an optical path at the exit of the optical fiber 12. The collimation optic 14 is placed directly at the exit of the optical fiber 12 for collimating the polychromatic light beam exiting the optical fiber 12 before in reaches the Powell lens 16. The Powell lens 16 is used to shape the collimated beam such that it shows a uniform profile along the x-axis. In this case, the Powell lens 16 is an acylindrical lens such that the shape of the beam remains unchanged along the z-axis. The focusing optic 20 focuses the shaped beam onto a target 30 to be illuminated in accordance with any specific application.

The collimation optic 14 is used to collimate the polychromatic light beam before it reaches the Powell lens 16. The collimation optic 14 consist of a doublet lens which properties are selected to collimate the polychromatic light beam.

The focusing optic 20 is used to focus the polychromatic light beam after is has been shaped using the Powell lens 16. In this embodiment, the focusing optic 20 consist of a beam expander that is not afocal. It comprises a first doublet lens 22 and a second doublet lens 24 spaced apart so as to focus the shaped polychromatic light beam on the target 30 to be illuminated. It is noted that other types of focusing optic may also be used. For example, the focusing optic 20 may consist of a single converging lens.

The polychromatic light is generated using a polychromatic light source 32. Such a polychromatic light source 32 typically consists of multiple single wavelength light sources combined using at least one reflective filter or an optical wavelength division multiplexer. An example of a polychromatic light source is described below with reference to FIG. 9.

The polychromatic light produced by the polychromatic light source 32 is coupled to the optical fiber 12 that is used for aligning the multiple wavelength components of the polychromatic light. The cutoff wavelength of the optical fiber 12 is selected such that the optical fiber 12 is single-mode. The polychromatic light beam exiting the optical waveguide is consequently Gaussian or nearly Gaussian. The cutoff wavelength of the optical fiber 12 also determines the divergence of the polychromatic light beam at the output of the optical fiber 12. As will be explained herein, the cutoff wavelength of the optical fiber 12 should also be selected to minimize a total dispersion of divergence of the polychromatic light beam over the considered range of wavelengths, i.e. the multiple wavelength components.

Figure 2:
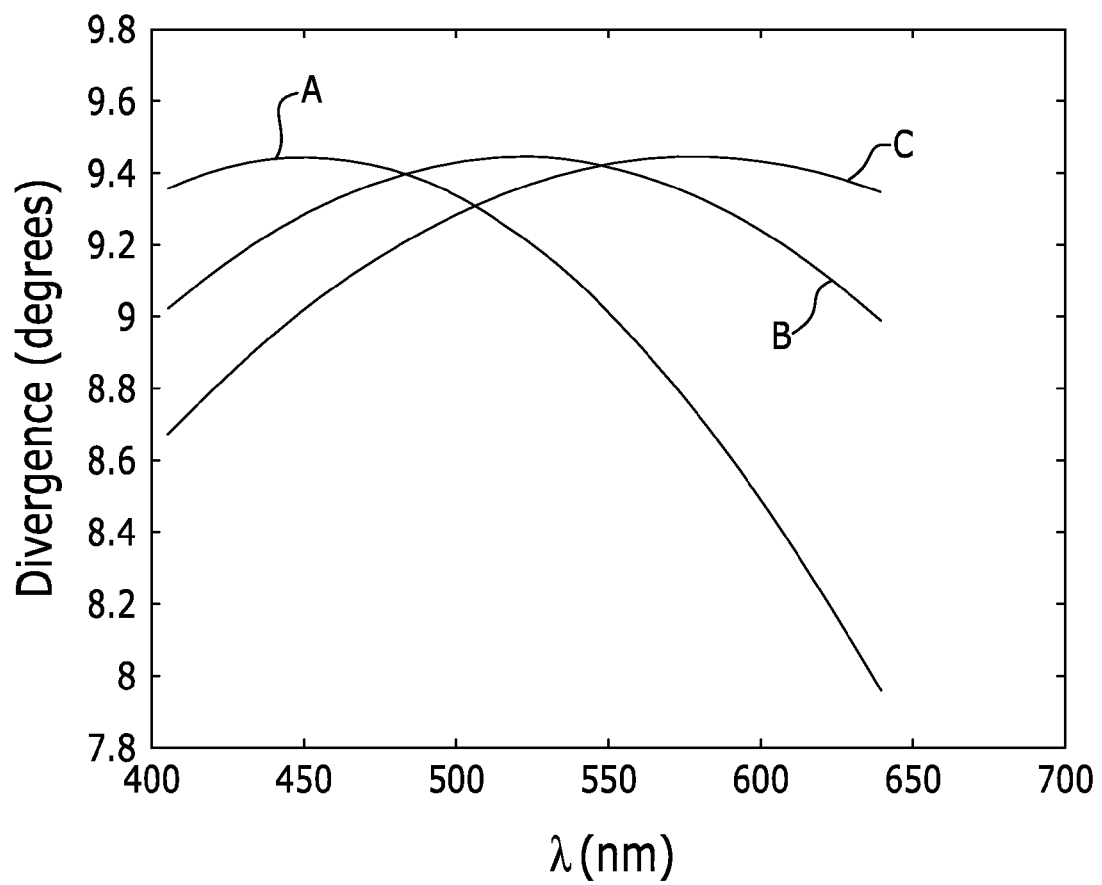
FIG. 2 is a graph showing the divergence at the output of different possible optical fibers A, B and C as a function of wavelength.

FIG. 2 is a graph showing the divergence at the output of different possible optical fibers A, B and C as a function of wavelength for an example wavelength range of 405 to 650 nm. The optical fiber A has a cutoff wavelength of 350 nm, the optical fiber B of 405 nm and optical fiber C of 450 nm. It can be seen that by selecting optical fiber B, the dispersion of divergence is minimized over the considered range of wavelengths. It is however noted that there is a remaining dispersion of divergence (i.e., a total variation of the divergence in the considered wavelength range) of about 0.4°.

Figure 3:
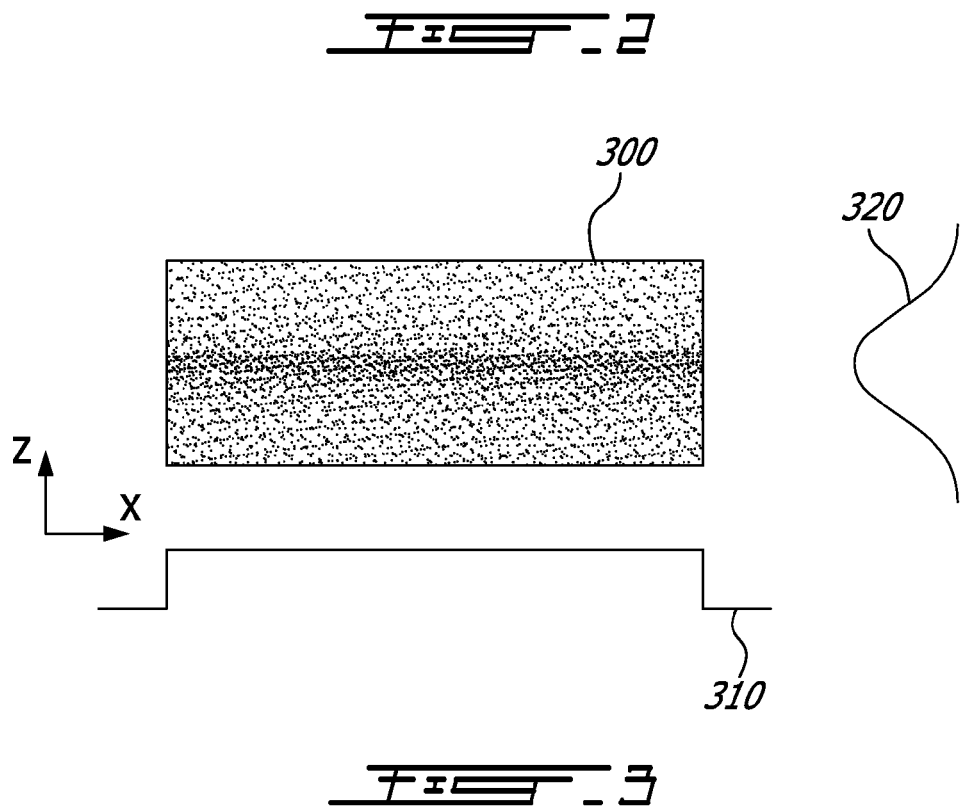
FIG. 3 is a diagram illustrating the two-dimensional profile of the beam as shaped using the optical system of FIG. 1.

The Powell lens 16 is used to shape the received collimated beam which is Gaussian shaped into a uniform profile along the x-axis, as shown in FIG. 3. FIG. 3 shows a representation of the shaped beam 300 in two dimensions. The uniform profile 310 as shaped along the x-axis is also shown, as well as the Gaussian profile 320 which remains unchanged along the z-axis.

Referring back to FIG. 1, the Powell lens 16 is an acylindrical lens with a primary surface that fits to a base curve defined in a Cartesian coordinate system (x,y,z) by the following equation:

$$y = \frac{cx^2}{1 + (1 - (1+Q)c^2x^2)^{1/2}},$$

wherein c is a curvature constant and Q is a conic constant.

A continuous correction function f(x) can be added to this equation, the correction function being defined by $$f(x) = \sum_i a_i x^i,$$

wherein $a_i$ are small value constants for small added corrections.

Using simulations, it was found that an appropriate absolute value of the product Q·c lies between about 0.25 and 1000 mm$^{-1}$ and Q should be less than −1. The primary surface that fits this equation may be the input surface or the output surface of the Powell lens 16. The other surface may be planar or cylindrical.

As noted above, Powell lenses are quite sensitive to the width of the laser beam at their input. Usually, for a Powell lens to be used to generate a polychromatic illumination with a uniform profile, the shape and width of the laser beam should be alike for all wavelengths of the laser beam. However, as shown if FIG. 2, even if the cutoff wavelength of the optical fiber 12 is selected to minimize a total dispersion of divergence of the polychromatic light beam over the considered range of wavelengths, there is a remaining dispersion of divergence over the wavelength components. This variation of the divergence among the various wavelength components of the polychromatic light beam results in a variation in wavelength of the width along the x-axis of the light beam incident to the Powell lens 16. This variation causes a deviation from uniformity of the uniform profile for at least part of the wavelength components. However, as will be explained hereinbelow, this deviation from uniformity is herein compensated by introducing a chromatic focal shift in the collimation optic 14 and the focusing optic 20, such that the resulting beam has a substantially uniform profile with a substantially uniform intensity along the x-axis for all the wavelength components of the polychromatic light.

Figure 4A:
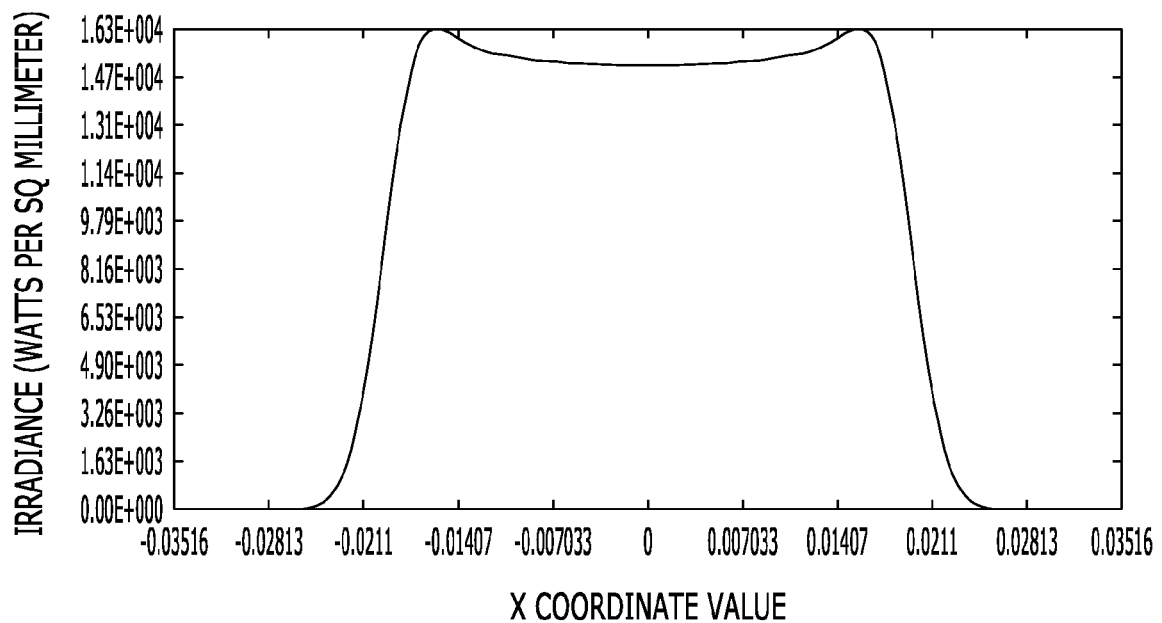
FIGS. 4A to 4E are graphs illustrating the deviation from uniformity of the profile shaped by a Powell lens when the width of the light beam at the input of the lens is varied.
Figure 4B:
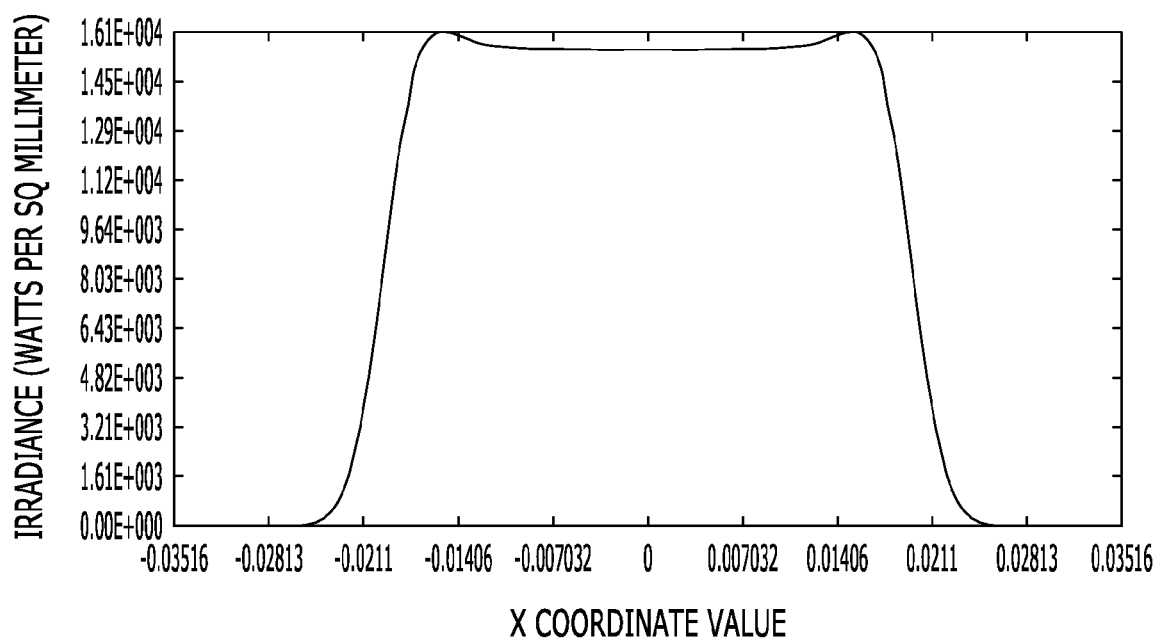
Figure 4C:
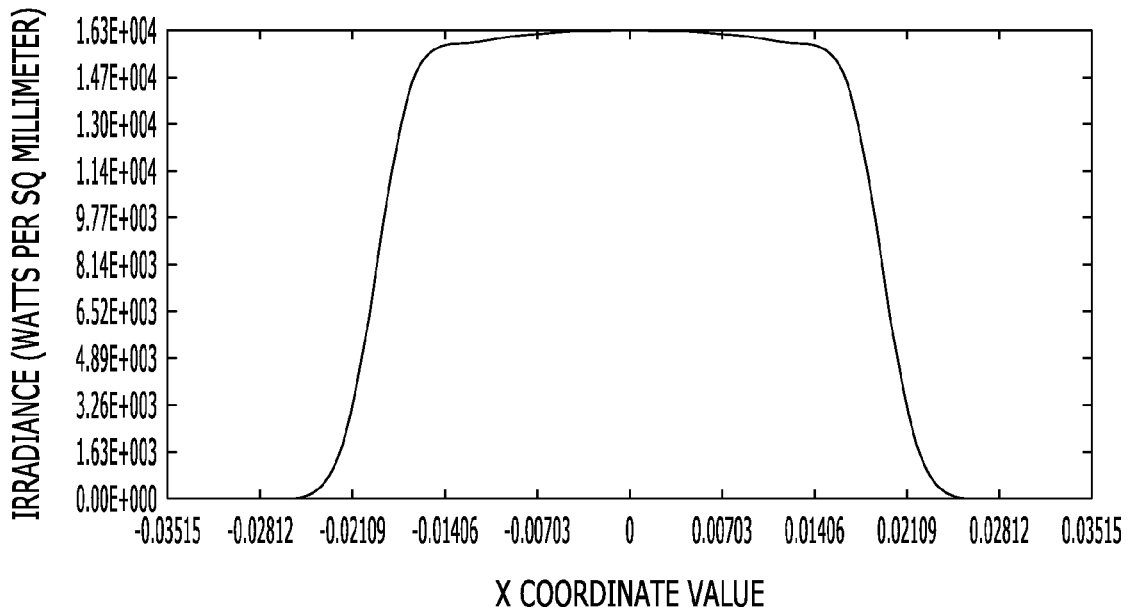
Figure 4D:
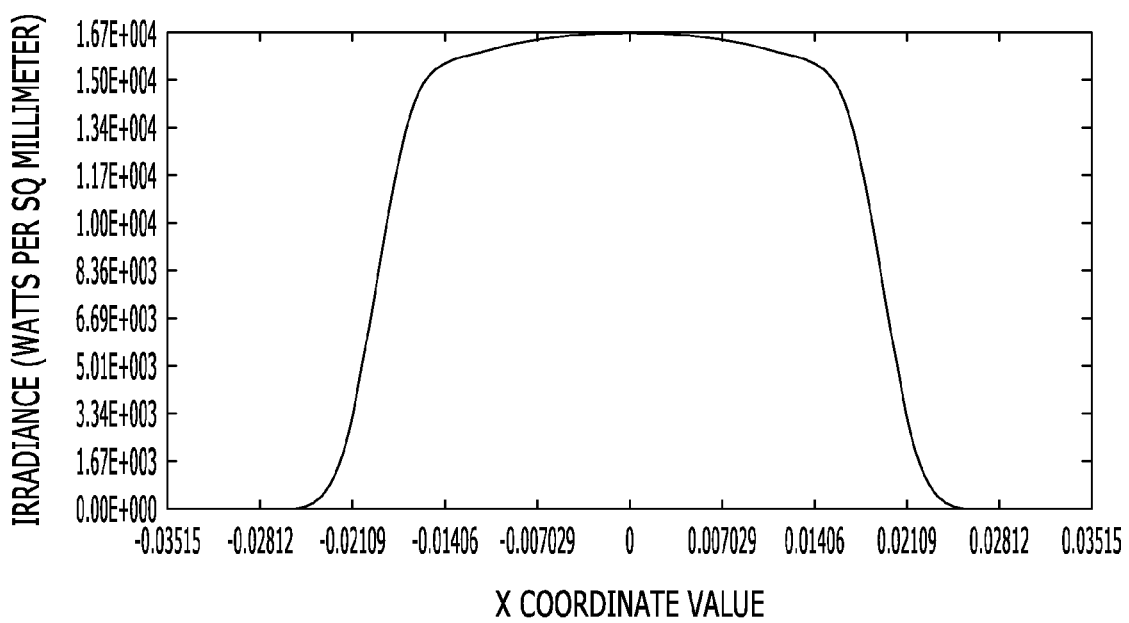
Figure 4E:
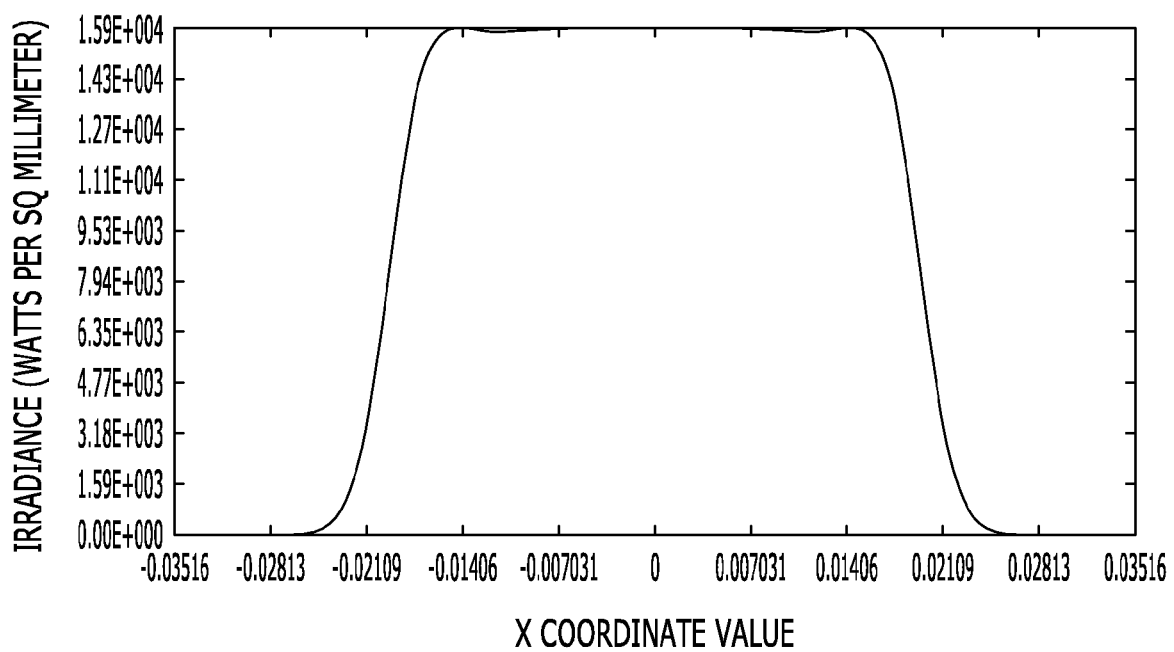

FIGS. 4A, 4B, 4C, 4D and 4E illustrate the deviation from uniformity of the profile shaped by a Powell lens when the width of the light beam at the input of the lens is varied. The irradiance of the output light beam at the focus of a focusing lens is shown as a function of the x-axis coordinate. The graphs of FIGS. 4A, 4B, 4C, 4D and 4E are obtained using a simulation software. In FIG. 4A, the input light beam has a width of 1.050 mm; in FIG. 4B, a width of 1.025 mm; in FIG. 4C, a width of 0.975 mm; in FIG. 4D, a width of 0.950 mm; and in FIG. 4E, a width of 1.000 mm, the latter being used as a reference. In this case, the Powell lens is designed for a width having a nominal value of 1.000 mm. It can be seen that the greater the difference between the width of the input light beam and the nominal value, the greater the deviation from uniformity of the profile.

In order to reduce the deviation from uniformity, a chromatic variation of the focal length, i.e. a chromatic focal shift, is introduced in the collimation optic 14 and/or the focusing optic 20. This comes from the fact that, when using a Powell lens to shape a single wavelength light beam at the focal plane of focusing optic, the resulting beam appearing in planes slightly offset from the focal plane shows deviations from uniformity that are similar to the ones of FIGS. 4A, 4B, 4C and 4D. Accordingly, by introducing a focal shift that varies in wavelength, it is possible to compensate for the deviation from uniformity caused by the dispersion of divergence of the optical fiber 12.

Figure 5A:
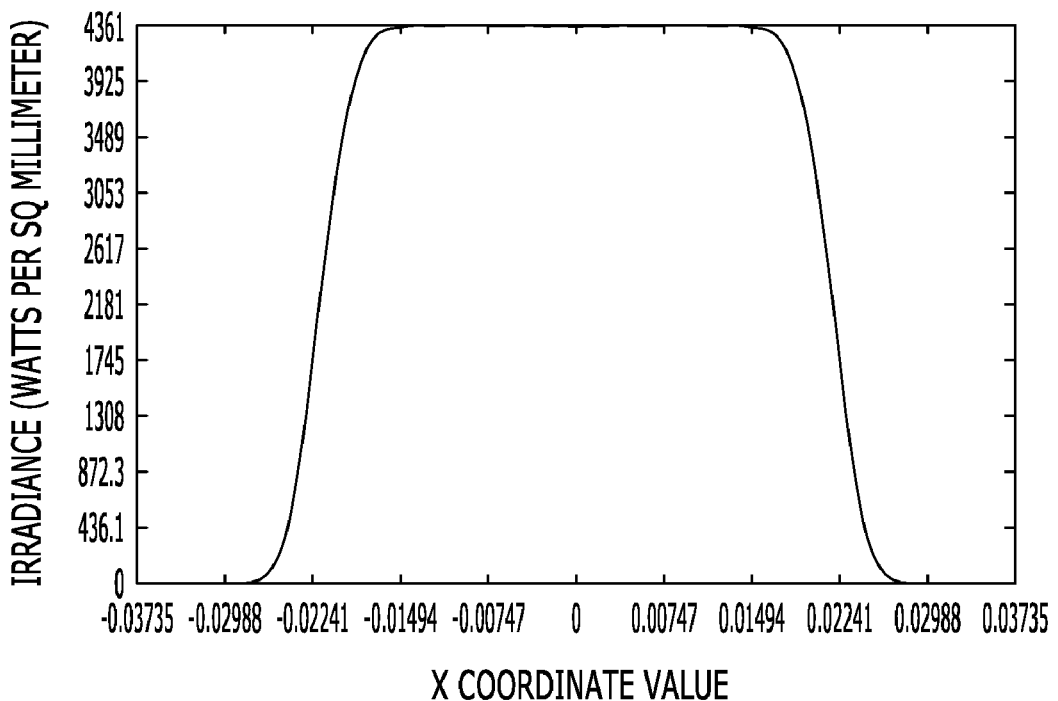
FIGS. 5A to 5D are graphs illustrating the compensation of the deviation from uniformity of FIGS. 4A to 4E using an offset shift of the focal plane.
Figure 5B:
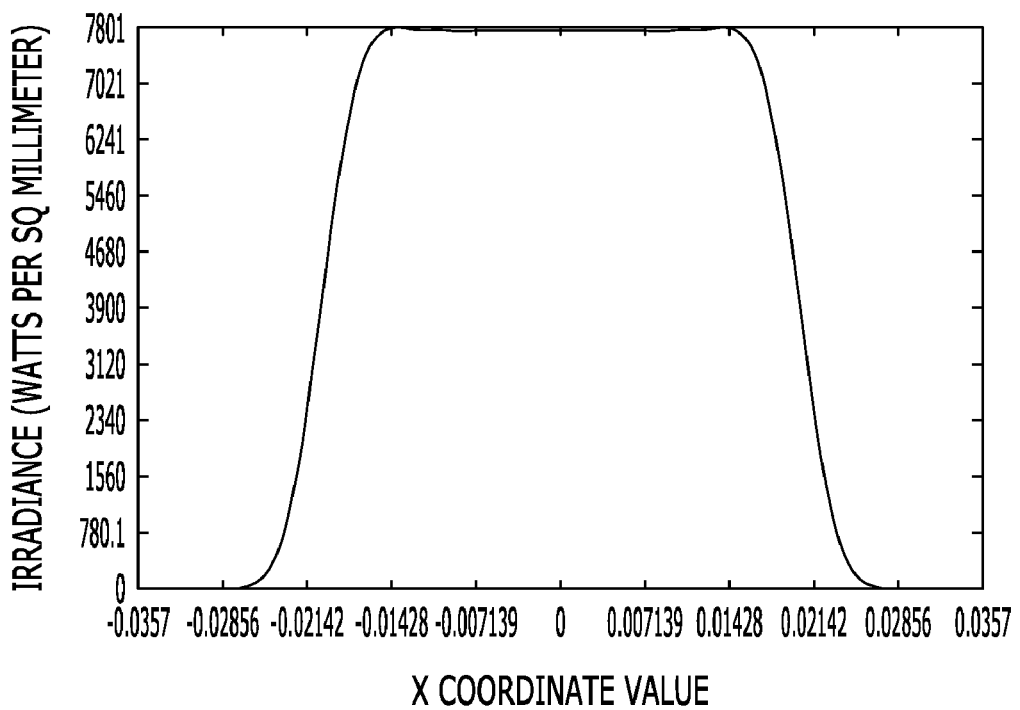
Figure 5C:
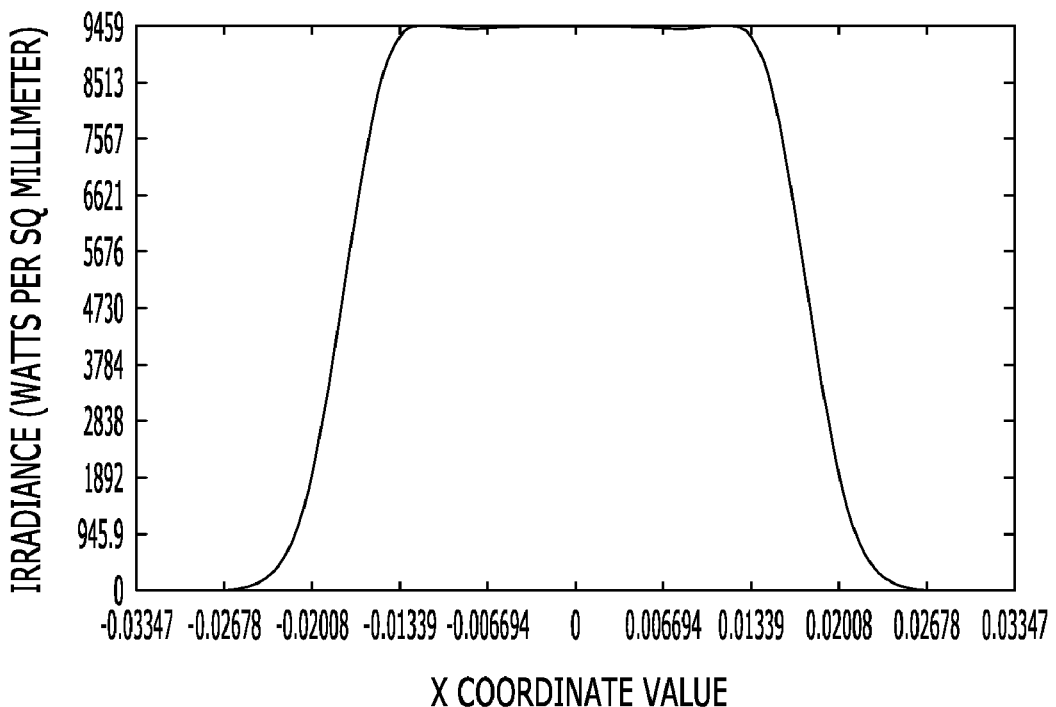
Figure 5D:
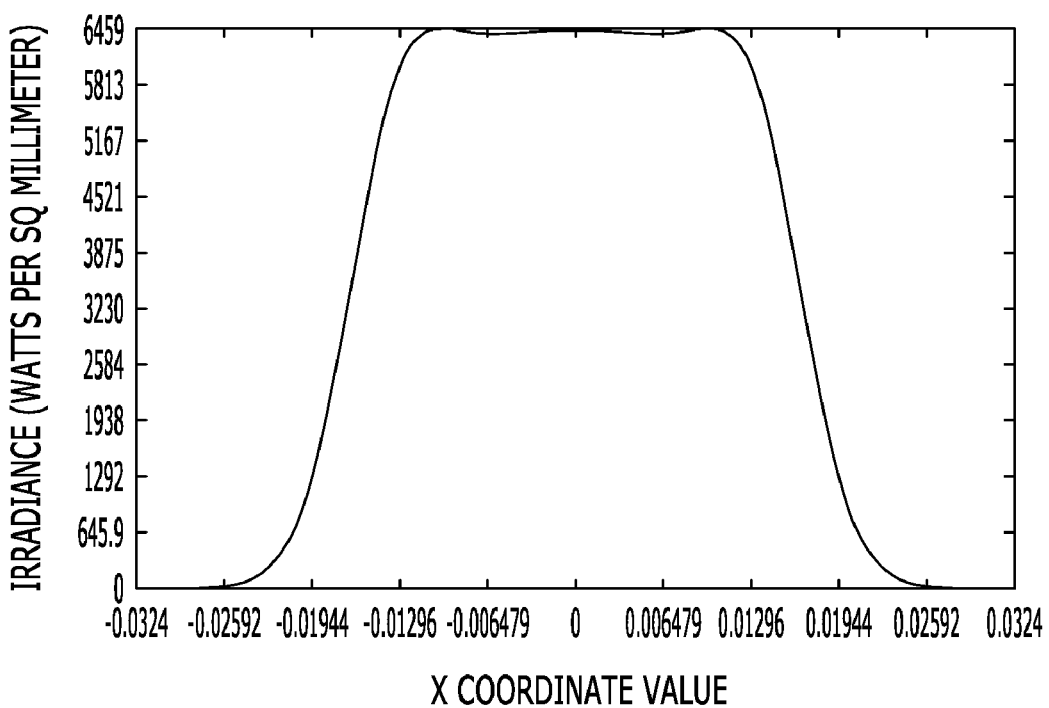

FIGS. 5A, 5B, 5C and 5D illustrate the compensation of the deviation from uniformity caused by the dispersion of divergence using an offset shift of the rendering plane. The graphs of FIGS. 5A, 5B, 5C and 5D are obtained using a simulation software. In FIG. 5A, the input light beam has a width of 1.050 mm and what is shown is the resulting beam appearing on a rendering plane offset by 40 μm from the focal plane of the focusing optic. In FIG. 5B, the input light beam has a width of 1.025 mm and what is shown is the resulting beam appearing on a plane offset by 20 μm. In FIG. 5C, the input light beam has a width of 0.975 mm and what is shown is the resulting beam appearing on a plane offset by −15 μm. In FIG. 5D, the input light beam has a width of 0.950 mm and what is shown is the resulting beam appearing on a plane offset by −30 μm. All graphs show a profile with good uniformity.

Similar uniformities are obtained by introducing a chromatic focal shift in the collimation and focusing optics to compensate for the deviation from uniformity caused by the dispersion of divergence of the optical fiber 12.

Selection of the Cutoff Wavelength

As explained above, the cutoff wavelength λc of the optical fiber 12 determines the dispersion of divergence of the polychromatic light beam at the output of the optical fiber 12. The dispersion of divergence should be minimized in order to obtain good uniformity of the profile after beam shaping using the Powell lens 16.

The divergence at the output of a single-mode optical fiber as a function of wavelength is determined as follows:

$$\theta(\lambda) = \frac{4\lambda m^2}{\pi \omega} \qquad (1)$$

where θ is the divergence obtained at $1/e^2$; λ is the wavelength; $m^2$ is a quality factor of the light beam; and ω is the diameter of the light as guided in the optical fiber. ω is given by:

$$\omega = D\left[a + \frac{b}{V^{3/2}} + \frac{c}{V^6}\right] \qquad (2)$$

where D is the diameter of the optical fiber core, V is the normalized frequency in the optical fiber (the V number) and a, b and c are parameters defined by Marcuse as a=0.65, b=1.619 and c=2.879 (see D. Marcuse, "Loss analysis of single-mode fiber splices", Bell Syst. Tech. J. 56, 703 (1977)). The V number is defined as follows:

$$V = \frac{\pi D N A}{\lambda} \quad (3)$$

where NA is the numerical aperture of the optical fiber.
Accordingly, defining $$\lambda c = \frac{\pi D N A}{2.405} \quad (4)$$

we find $$\theta(\lambda) = \frac{4\lambda * \lambda_c^{15/2} m^2}{\pi D \left[ \alpha \lambda_c^{15/2} + \beta \lambda^{3/2} \lambda_c^6 + \gamma \lambda^6 \lambda_c^{3/2} \right]} \quad (5)$$

where $\alpha = a/2.405$, $\beta = b/2.405$ et $\gamma = c/2.405$.

It can then be shown that the total dispersion of divergence $\Delta\theta$ over the wavelength range $[\lambda_1, \lambda_2]$ is minimized for the solution in Ac of the following equation:

$$\lambda_c^6 [\alpha\lambda_1 - \alpha\lambda_2] + \lambda_c^{9/2} [\beta\lambda_1\lambda_2^{3/2} - \beta\lambda_2\lambda_1^{3/2}] + \gamma\lambda_2^6\lambda_1 - \gamma\lambda_2\lambda_1^6 = 0. \quad (6)$$

In the example wavelength range of $[\lambda_1, \lambda_2] = [405$ nm, $650$ nm], the solution is $\lambda c = 405$ nm when using Marcuse's parameters. The dispersion of divergence may then be calculated using equation (5).

Selection of the Chromatic Focal Shift

In the optical system 10 of FIG. 1, the width of the light beam at $1/e^2$ at the input of the Powell lens 16 is given by:

$$B_s(\lambda) = 2f \tan[\theta(\lambda)/2] \quad (7)$$

where f is the focal length of the collimation optic 14.

The required focal shift for compensating the dispersion of divergence is function of $B_s(\lambda)$, R, FA and F where R is a diffraction parameter, FA is the fan angle of the Powell lens, F is the focal length of the focusing optic and k is a constant value which is a function of the shape of the uniform profile.

The diffraction parameter R of the Powell lens is given by:

$$R = \frac{\tan\left(\frac{FA}{2}\right) * \pi * \overline{B_s}}{2 * \lambda * m^2}. \quad (8)$$

For R>6, the diffraction effect is considered to be low.

The shape of the uniform profile is typically considered to fit a super-Gaussian function defined by:

$$f(x) = e^{-\rho x} n, \quad (9)$$

where n is a positive and even number and $\rho$ is a constant.

In practice, the required chromatic focal shift is calculated using an optical lens simulation software. FIG. 6 illustrates an example method for selecting the chromatic focal shift needed in the collimation optic 14 and the focusing optic 20, using a simulation software.

In step 602, each wavelength component of the divergent polychromatic light beam at the output of the optical fiber 12 is modeled as a Gaussian beam having a divergence as given by equation (1).

In step 604, the focal lengths of the collimation optic 14 and the focusing optic 20 are selected to achieve the working distance and the diffraction parameter R desired for the specific application.

In step 606, the optical system 10 is modeled using paraxial lenses instead of real lenses for the collimation optic 14 and the focusing optic 20. Paraxial lenses are ideal lenses modeled as a single plan, i.e with no thickness, and having a specific focal length, no aberrations and no chromatic focal shift.

In step 608, the Powell lens 16 is designed by selecting the curvature constant c and the conic constant Q adapted to achieve the desired fan angle FA and intensity uniformity at the focal plane of the focusing optic 20, at the central wavelength.

In step 610, within the simulation software and for each wavelength component of the polychromatic light beam, the rendering plane is slightly offset from the focal plane of the focusing optic 20. As discussed hereinabove with reference to FIGS. 5A-5D, the offset shift of the rendering plane required to achieve a substantially uniform intensity distribution is determined.

Finally, in step 612, this offset shift corresponds to the chromatic focal shift that should be introduced in the collimation optic 14 and the focusing optic 20 to compensate for the dispersion of divergence.

EXAMPLE

A specific example of parameter values that can be used in the optical system 10 illustrated in FIG. 1 is now given. In this specific example, the optical system 10 is adjusted to operate with a polychromatic light having wavelength components lying between 405 to 650 nm. This range of wavelengths is typically used in biomedical applications, more specifically in flow cytometry.

The selected optical fiber 12 is an optical fiber of the model PM-48-25A by Corning™, having a cutoff wavelength of 410 nm.

The collimation optic 14 is a doublet lens, model #AC050-010-A1 by Thorlabs. The radius of the first, second and third surfaces are respectively 15.42 mm, 4.25 mm and −6.55 mm; the thickness of the first and second lenses are respectively 1.9 mm and 2.5 mm; and the material of the first and second lenses are respectively SF5 glass and BAK4 glass.

The Powell lens 16 is made by StockerYale and has a first Powell surface, and a second surface that is planar. The conic constant Q of the Powell surface is −30000 and the curvature constant c is 0.00625 mm$^{-1}$. The thickness of the Powell lens 16 is 6.2 mm and it is made of Bk7 glass.

First doublet lens 22 of the focusing optic 20 is a doublet lens, model #ACN127-030-A1 by Thorlabs. The radius of the first, second and third surfaces are respectively −16.18 mm, 16.48 mm and 154.2 mm; the thickness of the first and second lenses are respectively 1.5 mm and 2.3 mm; and the material of the first and second lenses are respectively BAK4 glass and SF5 glass.

Second doublet lens 24 of the focusing optic 20 is a doublet lens, model #AC127-030-A1 by Thorlabs. The radius of the first, second and third surfaces are respectively 17.865 mm, −13.53 mm and −44.17 mm; the thickness of the first and second lenses are respectively 3.5 mm and 1.5 mm; and the material of the first and second lenses are respectively BK7 glass and SF2 glass.

Figure 7:
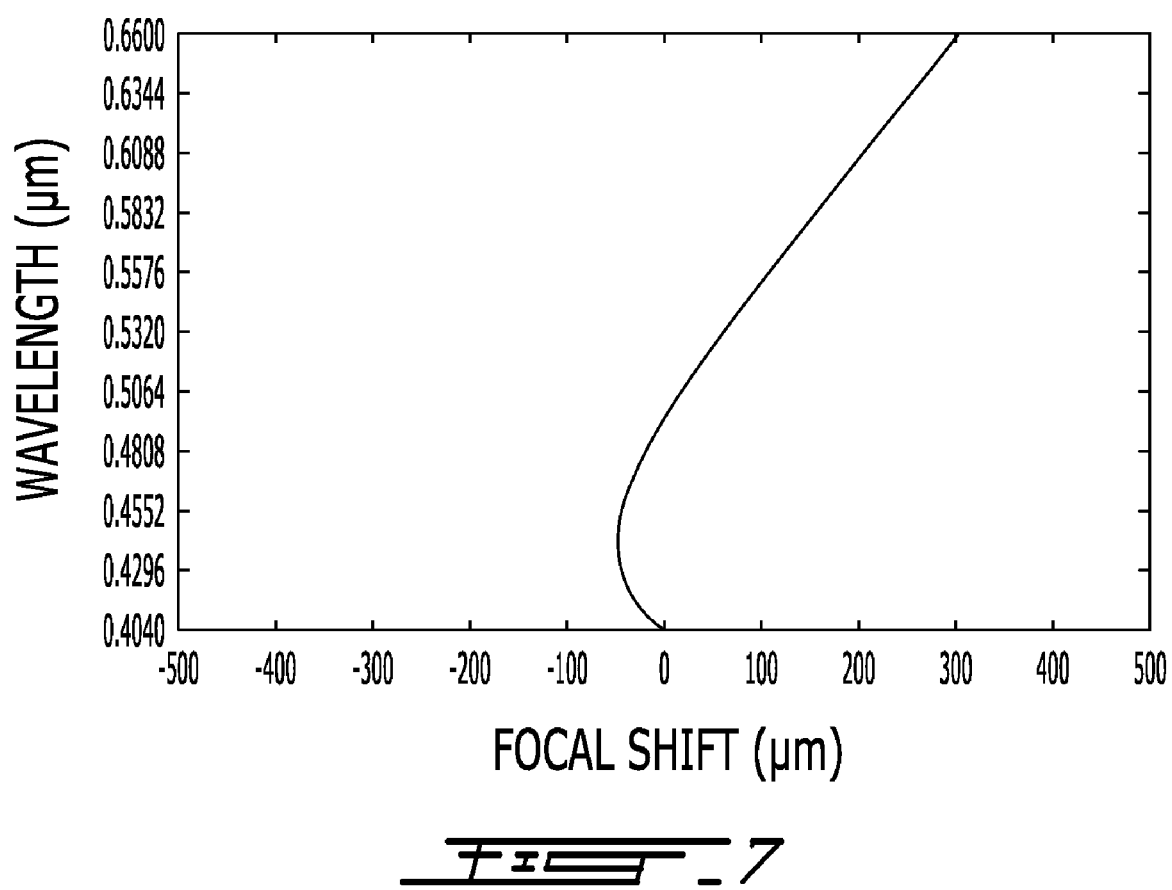
FIG. 7 is a graph showing the variation in wavelength of the focal shift obtained with an example of the optical system of FIG. 1.
Figure 8A:
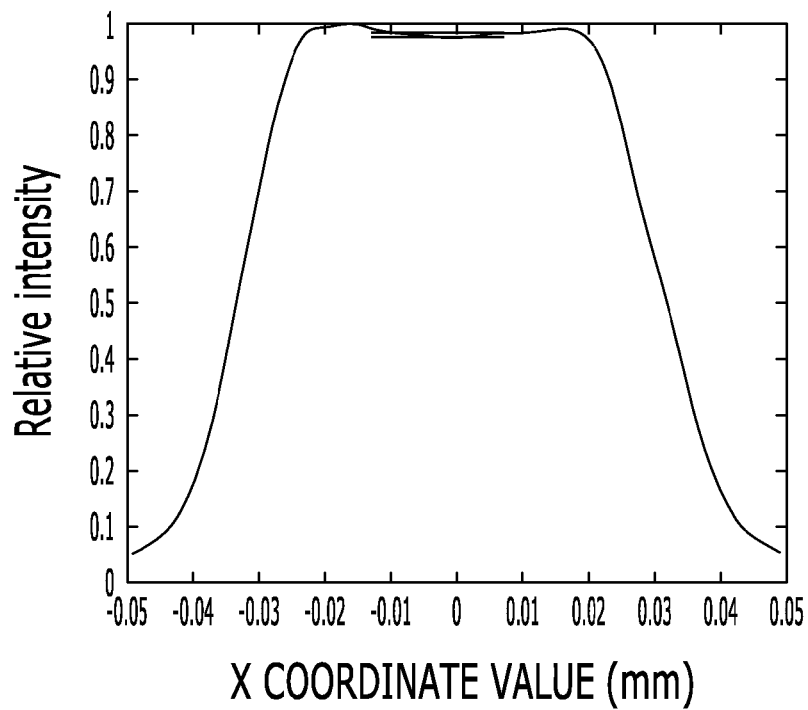
FIGS. 8A to 8D are graphs showing the profile obtained experimentally along the x-axis with an example of the optical system of FIG. 1.
Figure 8B:
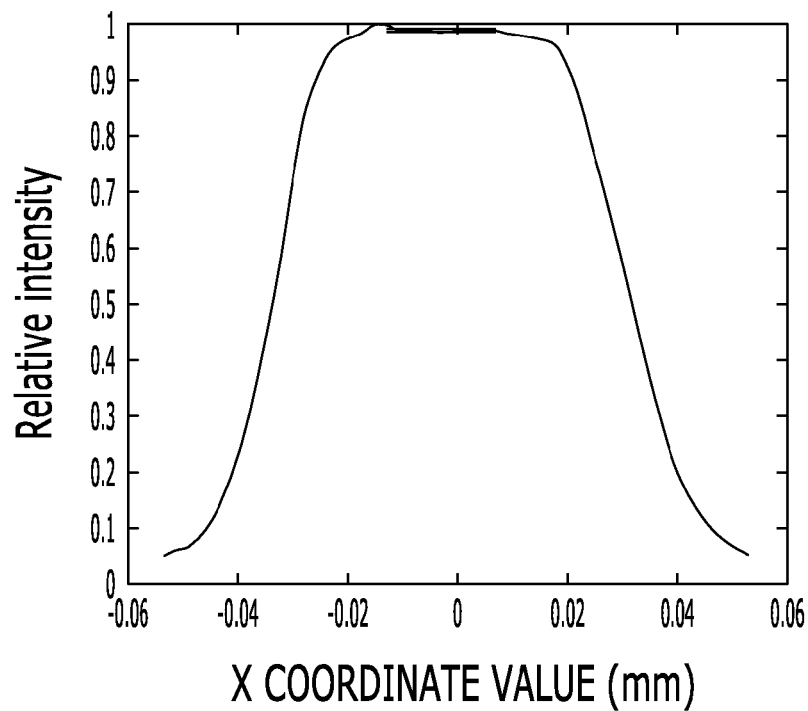
Figure 8C:
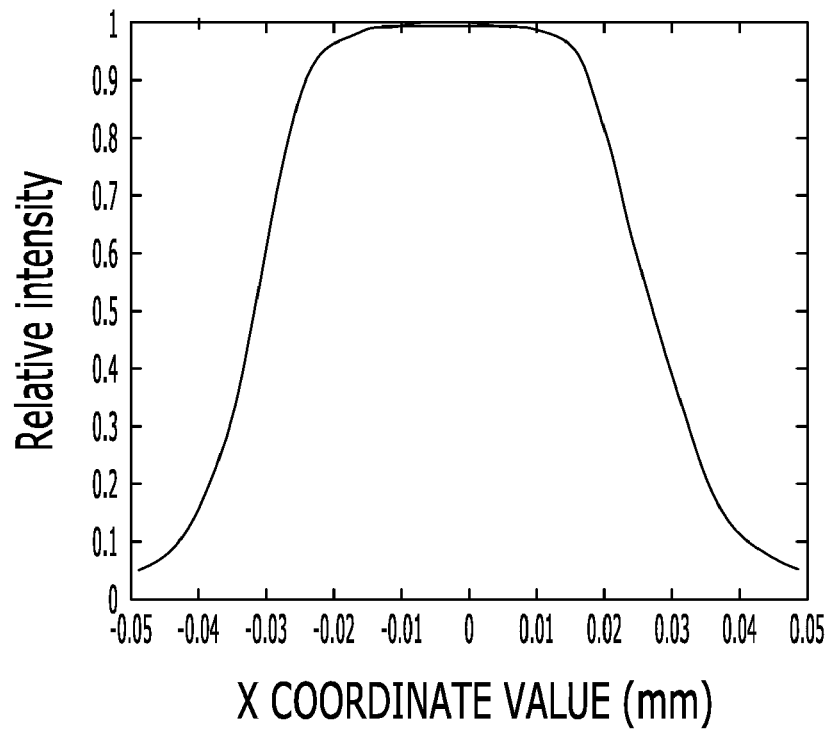
Figure 8D:
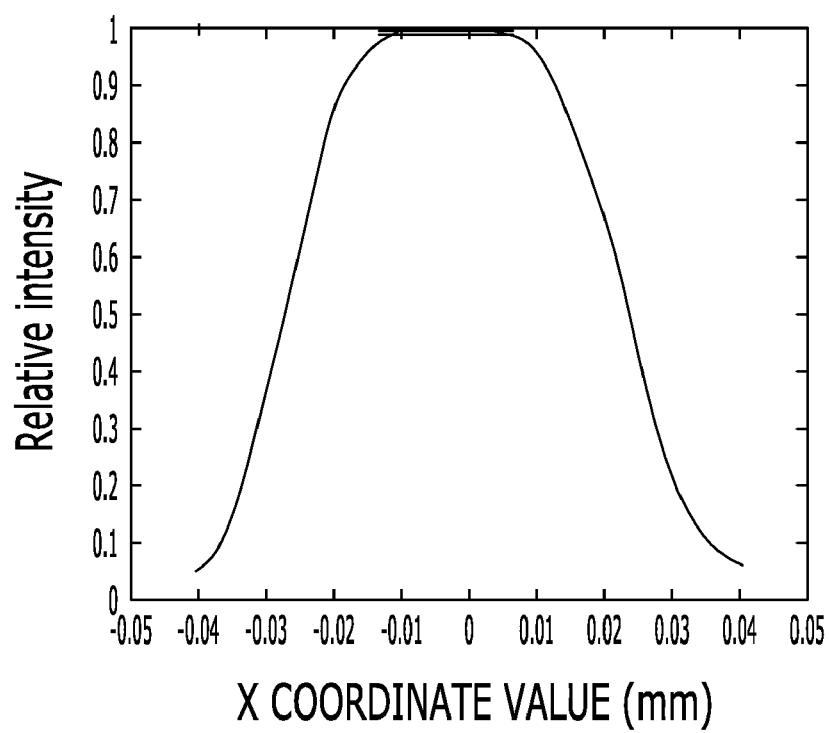

FIG. 7 shows the resulting variation in wavelength of the focal shift obtained with the optical system 10 according to the specific example described herein.

With this optical system 10, a uniform profile having a length of 20 μm is obtained in the x-axis, at a distance of 45 mm of the focusing optic 20 and over the wavelength range of 405 to 650 nm. FIGS. 8A, 8B, 8C and 8D show the profile obtained experimentally along the x-axis with wavelengths respectively of 660, 560, 493 and 404 nm. It can be seen that the profiles show substantially uniform intensity on a 20 μm length along the x-axis, for the whole range of wavelengths.

FIG. 9 shows a light beam source system 900 for providing a polychromatic light beam having a substantially uniform profile along the x-axis. The light beam source system 900 comprises a polychromatic light source 902 for providing a polychromatic light having multiple wavelength components, and a optical system 10 as already described with reference to FIG. 1. The optical system 10 will therefore not be repeatedly described.

The polychromatic light source 902 comprises multiple single wavelength light sources 904 combined using an optical wavelength division multiplexer 906. Each single wavelength light source 904 consists of a laser source such as a laser diode that produces a light signal at one of the multiple wavelength components of the polychromatic light to be generated. There is one single wavelength light source 904 for each wavelength component. The outputs of the single wavelength light sources 904 are each coupled to an optical fiber leading to the optical wavelength division multiplexer 906.

In this embodiment, the optical wavelength division multiplexer 906 is an Arrayed Waveguide Grating (AWG) and combines the received wavelength components into a single polychromatic light signal. The thereby provided polychromatic light is coupled to the optical fiber 12 of the optical system 10 for shaping with a uniform profile.

FIG. 10 shows a different pattern that may be used to illuminate a target according to other applications. In FIG. 10, the pattern 1000 of the shaped beam is shown in two dimensions. The pattern 1000 comprises multiple sub-patterns 1002, 1004, 1006 and 1008 spaced apart along the z-axis and each corresponding to a different wavelength, respectively $\lambda_1$, $\lambda_2$, $\lambda_3$ and $\lambda_4$. Each sub-pattern 1002, 1004, 1006, 1008 shows a uniform profile 1010 along the x-axis and a Gaussian profile 1020 along the z-axis.

The pattern 1000 of FIG. 10 shows a one-dimension array of sub-patterns 1002, 1004, 1006, 1008. In other applications, a two-dimensional array of sub-patterns may also be generated, each row of the array corresponding to one wavelength.

In yet other applications, a rectangular beam with uniform profiles along both the x- and the z-axes are obtained using two orthogonally disposed acylindrical Powell lenses as described in U.S. Pat. No. 7,400,457 to Cayer, along with the optical fiber and the collimation and focusing optics described herein.

Furthermore, in the embodiment of FIG. 1, the Powell lens 16 is an acylindrical lens which shapes the light beam along the x-axis only. It is however noted that in other embodiments, the acylindrical Power lens 16 may be replaced by an aspherical Powell lens defined by a revolution of a Powell base curve, i.e. a curve in the shape of an angle with a rounded apex as described above. In this case, the light beam is not only shaped along the x-axis but also along the z-axis. The shaped light beam on target 30 thereby defines a circle with uniform intensity.

Figure 11:
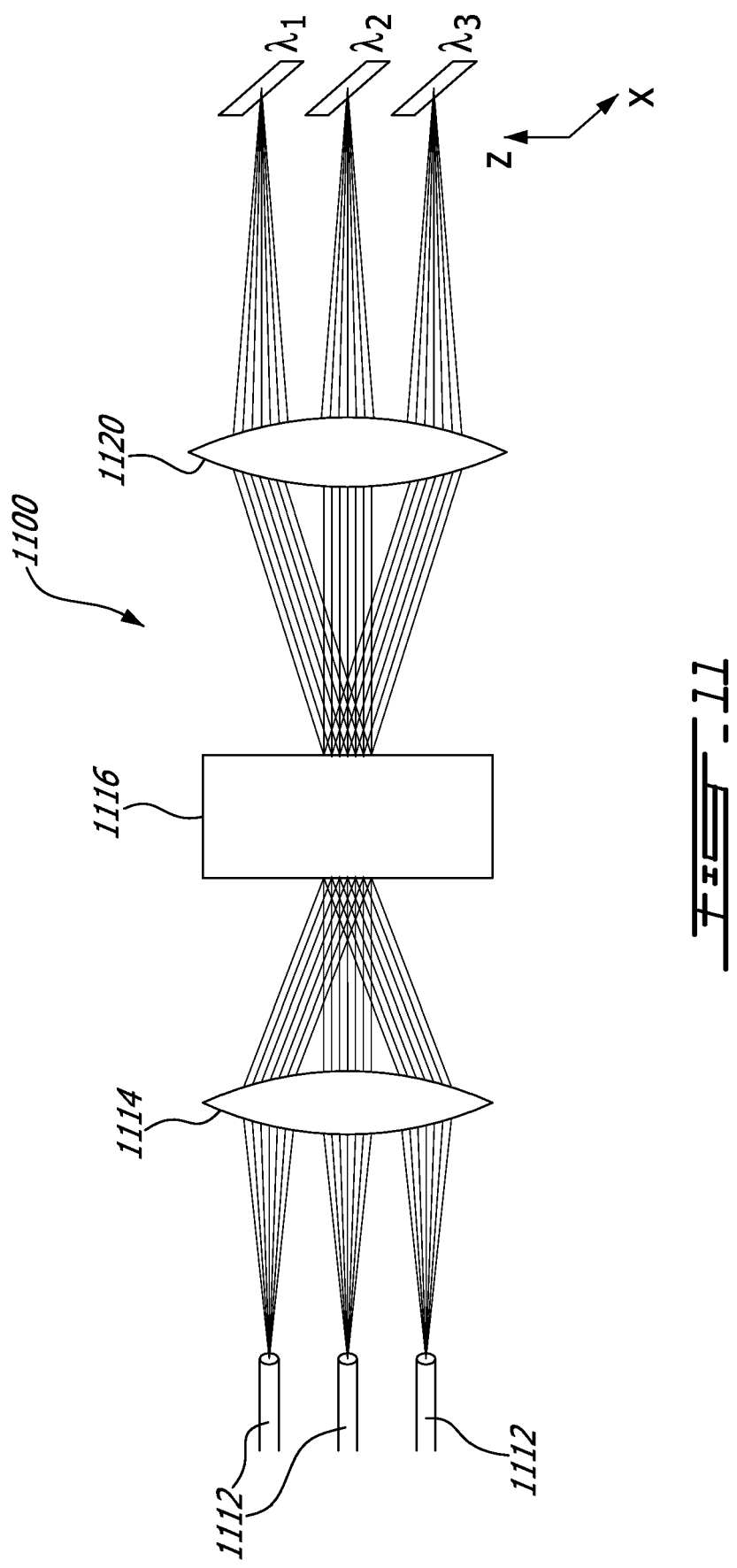
FIG. 11 is a block diagram illustrating a first optical system adapted to produce the pattern of FIG. 10 using an array of optical fibers, one optical fiber for each wavelength, and spherical and acylindrical lenses.
Figure 17:
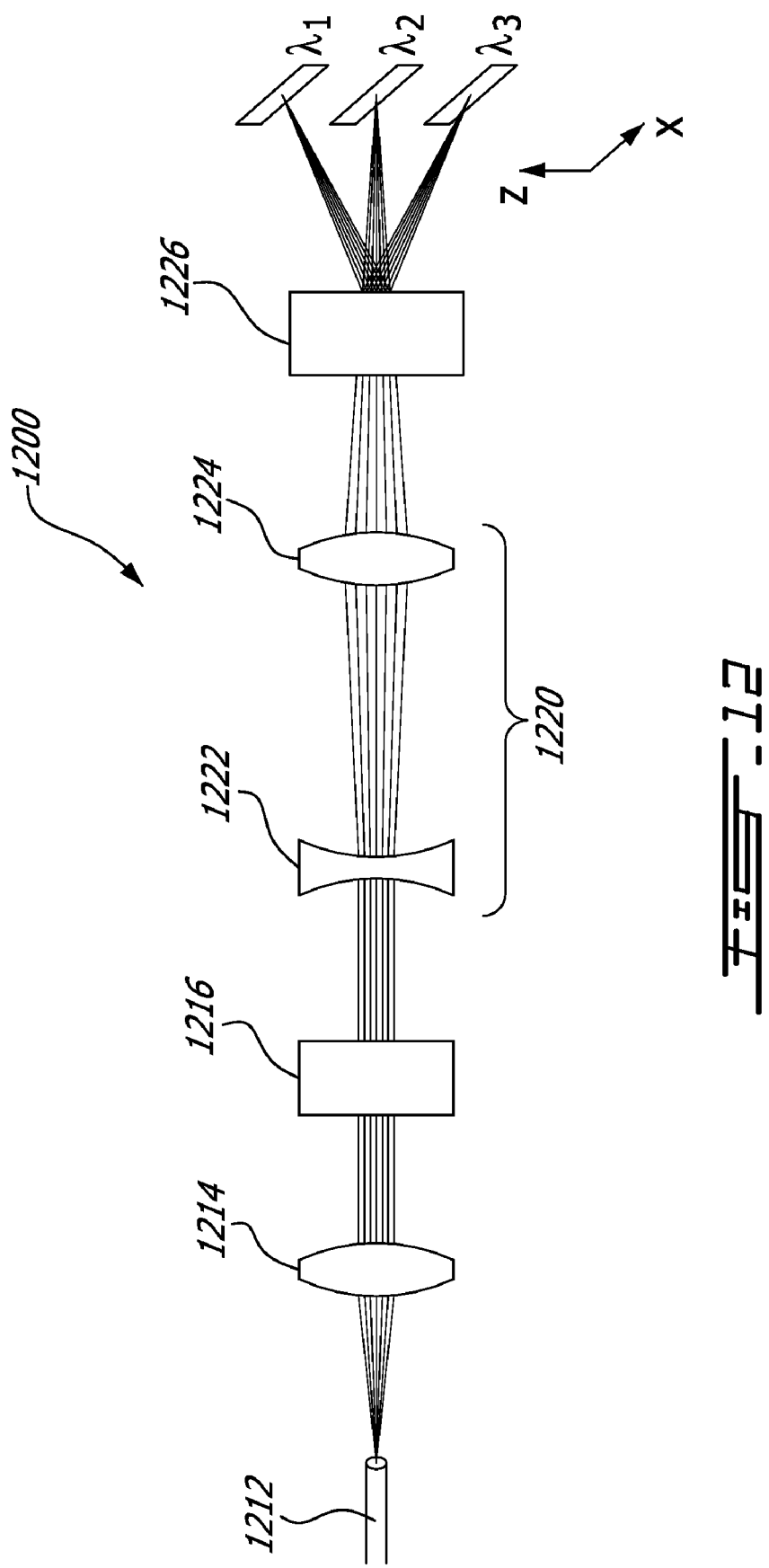

FIG. 11 shows an optical system 1100 adapted to produce the pattern 1000 of FIG. 10. In the optical system 1100, the wavelength components $\lambda_1$, $\lambda_2$, $\lambda_3$ of the input light beam are provided on separate optical fibers 1112 which outputs are spaced apart at the input of the lens system. All wavelength components still share the same lenses for collimation, shaping and focusing.

Accordingly, the wavelength components $\lambda_1$, $\lambda_2$, $\lambda_3$ are each provided on a separate optical fiber 1112 and the optical fibers 1112 are disposed in an array along the z-axis. A spherical collimation optic 1114, an acylindrical Powell lens 1116 and a spherical focusing optic 1120, including a single lens in this case are disposed such that each wavelength component $\lambda_1$, $\lambda_2$, $\lambda_3$ at optical fibers 1112 travels on an equivalent optical paths within the optical system 1100. The optical system 1100 thereby provides a pattern 1000 as shown in FIG. 10 with multiple sub-patterns spaced apart along the z-axis and each corresponding to a distinct wavelength component $\lambda_1$, $\lambda_2$, $\lambda_3$.

In the optical system 1100 of FIG. 11, the same type of optical fiber 1112 is used for all wavelength components $\lambda_1$, $\lambda_2$, $\lambda_3$. Similarly to the optical system 10 of FIG. 1, there therefore exists a dispersion of divergence among the wavelength components $\lambda_1$, $\lambda_2$, $\lambda_3$. However, because the collimation optic 1114 and the focusing optic 1120 together have a chromatic focal shift that compensates for the dispersion of divergence, it is possible to use the same lenses 1114, 1116, 1122, 1124 for all wavelength components $\lambda_1$, $\lambda_2$, $\lambda_3$.

FIG. 12 shows another optical system 1200 which is also adapted to produce the pattern 1000 of FIG. 10. Similarly to the optical system 10 of FIG. 1, in optical system 1200, all wavelength components $\lambda_1$, $\lambda_2$, $\lambda_3$ of the input light beam are provided on a same optical fiber 1212 and propagates together through a spherical collimation optic 1214, an acylindrical Powell lens 1216 and a focusing optic 1220, including a first spherical lens 1222 and a second spherical lens 1224. A dispersive optical prism 1226 is disposed at the output of the focusing optic 1220 to split apart the various wavelength components $\lambda_1$, $\lambda_2$, $\lambda_3$ along the z-axis so as to provide a pattern 1000 as shown in FIG. 10 with multiple sub-patterns spaced apart along the z-axis and each corresponding to a distinct wavelength component $\lambda_1$, $\lambda_2$, $\lambda_3$.

As in the optical system 10 of FIG. 1, the cylindrical Powell lens 1116 or 1216 may be replaced by an aspherical Powell lens for shaping along both the x- and the z-axes. Two orthogonally disposed acylindrical Powell lenses may also be used.

It is noted that the optical fibers which are used in the optical systems described herein may be replaced by other types of optical waveguides such as planar waveguides for example.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

What is claimed is:

1. An optical system for providing a polychromatic divergent light beam with a substantially uniform profile along a first axis said polychromatic divergent light having multiple wavelength components with a dispersion of divergence, the system comprising:

a collimation optic receiving said polychromatic divergent light and for collimating said polychromatic divergent light to provide a substantially collimated beam, said collimation optic providing a first chromatic focal shift;

a shaping lens having a primary surface with a curve adapted for shaping said collimated beam into a shaped beam with a nearly uniform profile along said first axis, said dispersion of divergence causing a deviation from uniformity of said nearly uniform profile for at least part of said multiple wavelength components; and a focusing optic positioned for focusing said shaped beam, said focusing optic providing a second chromatic focal shift;

wherein a combination of said first chromatic focal shift and said second chromatic focal shift compensates for said dispersion of divergence, so as to reduce said deviation from uniformity to obtain a profile with a substantially uniform intensity along said first axis, for all of said multiple wavelength components.

2. The system as claimed in claim 1, further comprising an optical waveguide for propagating therein a polychromatic light having multiple wavelength components, said polychromatic light to exit said optical waveguide to provide said divergent light at an output of said optical waveguide, said optical waveguide having a cutoff wavelength defining said dispersion of divergence of said divergent light at said output.

3. The system as claimed in claim 2, wherein said cutoff wavelength of said optical waveguide is selected such that said dispersion of divergence is minimized over said multiple wavelength components and that said optical waveguide is single-mode over said multiple wavelength components.

4. The system as claimed in claim 1, wherein said primary surface is an acylindrical surface defined by a base curve that fits an equation in a Cartesian coordinate system (x,y), said equation being $$y = \frac{cx^2}{1 + (1 - (1+Q)c^2x^2)^{1/2}} + f(x),$$

c being a curvature constant, Q being a conic constant and f(x) being a correction function, said correction function being continuous.

5. The system as claimed in claim 4, wherein a magnitude of the absolute value of the product Q·c lies between 0.25 and 1000 mm$^{-1}$ and wherein Q is less than −1.

6. The system as claimed in claim 4, wherein said shaping lens comprises a secondary surface, said secondary surface being one of a planar surface and a cylindrical surface.

7. The system as claimed in claim 1, wherein said primary surface is an aspherical surface defined by a revolution of a base curve that fits an equation in a Cartesian coordinate system (x,y), said equation being $$y = \frac{cx^2}{1 + (1 - (1+Q)c^2x^2)^{1/2}} + f(x),$$

c being a curvature constant, Q being a conic constant and f(x) being a correction function, said correction function being continuous.

8. The system as claimed in claim 1, wherein said focusing optic comprises a beam expander.

9. The system as claimed in claim 1, further comprising a diffractive element positioned for splitting said shaped beam into a plurality of beams defining an array of substantially uniform profiles.

10. The system as claimed in claim 2, wherein the optical waveguide is an optical fiber.

11. A light beam source system for providing a polychromatic light beam with a substantially uniform profile along a first axis, said light beam source system comprising:

a polychromatic light source for providing a polychromatic light having multiple wavelength components;

an optical waveguide coupled to said incident light source for propagating therein said polychromatic light, said polychromatic light to exit said optical waveguide at an output and said optical waveguide having a cutoff wavelength defining a dispersion of divergence of the polychromatic light at said output;

a collimation optic positioned for collimating said polychromatic light at said output to provide a substantially collimated beam, said collimation optic providing a first chromatic focal shift;

a shaping lens having a primary surface with a curve adapted for shaping said collimated beam into a shaped beam with a nearly uniform profile along said first axis, said dispersion of divergence causing a deviation from uniformity of said nearly uniform profile for at least part of said multiple wavelength components; and a focusing optic positioned for focusing said shaped beam, said focusing optic providing a second chromatic focal shift;

wherein a combination of said first chromatic focal shift and said second chromatic focal shift compensates for said dispersion of divergence, so as to reduce said deviation from uniformity to obtain a profile with a substantially uniform intensity along said first axis, for all of said multiple wavelength components.

12. The light beam source system as claimed in claim 11, wherein said light source comprises a plurality of single wavelength light sources each for generating one of said multiple wavelength components, and a wavelength division multiplexer for combining said multiple wavelength components to provide said polychromatic light.

13. The system as claimed in claim 11, wherein said cutoff wavelength of said optical waveguide is selected such that said dispersion of divergence is minimized over said multiple wavelength components and that said optical waveguide is single-mode over said multiple wavelength components.

14. The system as claimed in claim 11, wherein said primary surface is an acylindrical surface defined by a base curve that fits an equation in a Cartesian coordinate system (x,y), said equation being $$y = \frac{cx^2}{1 + (1 - (1+Q)c^2x^2)^{1/2}} + f(x),$$

c being a curvature constant, Q being a conic constant and f(x) being a correction function, said correction function being continuous.

15. The system as claimed in claim 14, wherein a magnitude of the absolute value of the product Q·c lies between 0.25 and 1000 mm$^{-1}$ and wherein Q is less than −1.

16. The system as claimed in claim 11, further comprising a diffractive element positioned for splitting said shaped beam into a plurality of beams defining an array of uniform profiles.

17. The system as claimed in claim 11, wherein the optical waveguide is an optical fiber.

18. A method for providing a polychromatic light beam with a substantially uniform profile along a first axis, the method comprising:

provide a polychromatic divergent light having multiple wavelength components with a dispersion of divergence;

collimating said polychromatic divergent light using a collimation optic to provide a substantially collimated beam along said first axis with said collimation optic providing a first chromatic focal shift;

shaping said collimated beam into a shaped beam with a nearly uniform profile along said first axis, said dispersion of divergence causing a deviation from uniformity of said nearly uniform profile for at least part of said wavelength components of said polychromatic light;

focusing said shaped beam along said first axis using a focusing optic with said focusing optic providing a second chromatic focal shift; and selecting a chromatic focal shift providing by a combination of both of said collimation optic and said focusing optic such that said chromatic focal shift compensates for said dispersion of divergence, so as to reduce said deviation from uniformity to obtain a profile with a substantially uniform intensity along said first axis for all of said multiple wavelength components.

19. The method as claimed in claim 18, wherein said providing comprises:

propagating a polychromatic light having multiple wavelength components into an optical waveguide in order to provide said divergent light at an output of said optical waveguide, said optical waveguide having with a cutoff wavelength defining said dispersion of divergence of said polychromatic divergent light at said output.

20. The method as claimed in claim 19, further comprising:

selecting a cutoff wavelength of said optical waveguide so as to minimize said dispersion of divergence over said multiple wavelength components.

\* \* \* \* \*